United States Patent
Aoki et al.

(10) Patent No.: US 10,239,539 B2
(45) Date of Patent: Mar. 26, 2019

(54) VEHICLE TRAVEL CONTROL METHOD AND VEHICLE TRAVEL CONTROL DEVICE

(71) Applicant: Nissan Motor Co., Ltd., Yokohama-shi, Kanagawa (JP)

(72) Inventors: Motonobu Aoki, Kanagawa (JP); Susumu Fujita, Kanagawa (JP); Yohei Mishina, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/072,238

(22) PCT Filed: Jan. 4, 2017

(86) PCT No.: PCT/JP2017/000050
§ 371 (c)(1),
(2) Date: Jul. 24, 2018

(87) PCT Pub. No.: WO2017/130642
PCT Pub. Date: Aug. 3, 2017

(65) Prior Publication Data
US 2019/0031198 A1 Jan. 31, 2019

(30) Foreign Application Priority Data
Jan. 29, 2016 (JP) .................. 2016-015813

(51) Int. Cl.
*B60W 50/00* (2006.01)
*B60W 40/02* (2006.01)
*G08G 1/005* (2006.01)

(52) U.S. Cl.
CPC ........ *B60W 50/0097* (2013.01); *B60W 40/02* (2013.01); *B60W 50/0098* (2013.01);
(Continued)

(58) Field of Classification Search
None
See application file for complete search history.

(56) References Cited

U.S. PATENT DOCUMENTS 6,337,637 B1 * 1/2002 Kubota ............... B60T 7/18
180/271
8,164,432 B2 * 4/2012 Broggi ............. G01S 17/023
340/425.5

(Continued)

FOREIGN PATENT DOCUMENTS

JP 2009271766 A 11/2009
JP 2012133686 A 7/2012

(Continued)

*Primary Examiner* — Navid Ziaeianmehdizadeh
(74) *Attorney, Agent, or Firm* — Young Basile Hanlon & MacFarlane, P.C.

(57) ABSTRACT

A pedestrian crosswalk through which a subject vehicle is expected to pass is specified as a first pedestrian crosswalk and another pedestrian crosswalk located within a predetermined distance from the first pedestrian crosswalk is specified as a second pedestrian crosswalk. An extension process of extending an area of at least one of the first pedestrian crosswalk and the second pedestrian crosswalk is performed. When a determination is made that at least a part of the first pedestrian crosswalk and the second pedestrian crosswalk overlap each other, an area including the first pedestrian crosswalk and the second pedestrian crosswalk is set as a detection area of a detector detecting an object around the subject vehicle. A moving object is detected in the detection area using the detector. Travel of the subject vehicle is controlled on the basis of a detection result of the detector.

12 Claims, 13 Drawing Sheets

(52) U.S. Cl.
CPC ..... *B60W 2550/10* (2013.01); *B60W 2550/20* (2013.01); *G08G 1/005* (2013.01)

(56) References Cited

U.S. PATENT DOCUMENTS

| | | | | |
|---|---|---|---|---|
| 8,195,394 | B1* | 6/2012 | Zhu | G01C 21/26 |
| | | | | 382/107 |
| 8,903,640 | B2* | 12/2014 | Caminiti | G08G 1/0104 |
| | | | | 701/301 |
| 9,436,877 | B2* | 9/2016 | Edmondson | G06K 9/00771 |
| 9,718,405 | B1* | 8/2017 | Englander | G01S 19/13 |
| 2005/0201590 | A1* | 9/2005 | Kudo | B60W 30/16 |
| | | | | 382/103 |
| 2010/0061591 | A1 | 3/2010 | Okada et al. | |
| 2012/0161951 | A1 | 6/2012 | Ito et al. | |
| 2012/0182140 | A1* | 7/2012 | Kumabe | G08G 1/161 |
| | | | | 340/435 |
| 2012/0185160 | A1* | 7/2012 | Kumabe | G08G 1/164 |
| | | | | 701/301 |
| 2013/0013184 | A1 | 1/2013 | Morotomi et al. | |
| 2014/0062685 | A1* | 3/2014 | Tamatsu | B60Q 5/005 |
| | | | | 340/425.5 |
| 2015/0084791 | A1* | 3/2015 | Jang | G08G 1/07 |
| | | | | 340/944 |
| 2016/0193999 | A1* | 7/2016 | Sasabuchi | B60T 7/22 |
| | | | | 701/301 |
| 2017/0018187 | A1* | 1/2017 | Kim | G08G 1/166 |
| 2017/0038018 | A1* | 2/2017 | Johnson | H05B 37/0227 |
| 2018/0004206 | A1* | 1/2018 | Iagnemma | B60W 50/0098 |
| 2018/0141489 | A1* | 5/2018 | Zhang | B60Q 1/50 |
| 2018/0204462 | A1* | 7/2018 | Tomescu | B60T 7/22 |
| 2018/0326982 | A1* | 11/2018 | Paris | B60W 30/0956 |

FOREIGN PATENT DOCUMENTS

| | | |
|---|---|---|
| JP | 2015224935 A | 12/2015 |
| KR | 10-2008-0037712 A | 4/2008 |
| WO | 2011086661 A1 | 7/2011 |

\* cited by examiner

VEHICLE TRAVEL CONTROL METHOD AND VEHICLE TRAVEL CONTROL DEVICE

CROSS-REFERENCE TO RELATED APPLICATIONS

The present application claims priority to Japanese Patent Application No. 2016-015813 filed Jan. 29, 2016, the entire content of which is herein incorporated by reference.

TECHNICAL FIELD

The present invention relates to a travel control method for a vehicle and a travel control apparatus for a vehicle.

BACKGROUND

Heretofore known in the art is a technique of estimating whether or not a moving object crossing a pedestrian crosswalk and a subject vehicle come close to each other (e.g. WO2011/086661).

The prior art is, however, to detect only a moving object crossing a pedestrian crosswalk located ahead of the subject vehicle, that is, a moving object observed before the subject vehicle gets across the pedestrian crosswalk. The problem is therefore that a moving object that may come close to the subject vehicle when the subject vehicle approaches a pedestrian crosswalk cannot be detected before the subject vehicle comes close to the pedestrian crosswalk.

SUMMARY

A problem to be solved by the present invention is to provide a travel control method for a vehicle and a travel control apparatus for a vehicle with which a moving object that may come close to the subject vehicle when the subject vehicle approaches a pedestrian crosswalk can be detected before the subject vehicle comes close to the pedestrian crosswalk.

The present invention solves the above problem through specifying a pedestrian crosswalk located within a predetermined distance from a first pedestrian crosswalk through which a subject vehicle is expected to pass as a second pedestrian crosswalk, setting an area including the first pedestrian crosswalk and the second pedestrian crosswalk as a detection area for a moving object when a part of the first pedestrian crosswalk and a part of the second pedestrian crosswalk overlap each other by extending an area of at least one of the first pedestrian crosswalk and the second pedestrian crosswalk, and detecting the moving object in the detection area.

According to the present invention, the area including the second pedestrian crosswalk close to the first pedestrian crosswalk is set as the detection area for a moving object and, therefore, a moving object that may come close to the subject vehicle when the subject vehicle approaches a pedestrian crosswalk can be detected before the subject vehicle comes close to the pedestrian crosswalk.

DETAILED DESCRIPTION

Hereinafter, one or more embodiments of the present invention will be described with reference to the drawings. In the embodiments, a travel control apparatus for a vehicle equipped in the vehicle will be exemplified and described.

First Embodiment

Figure 1:
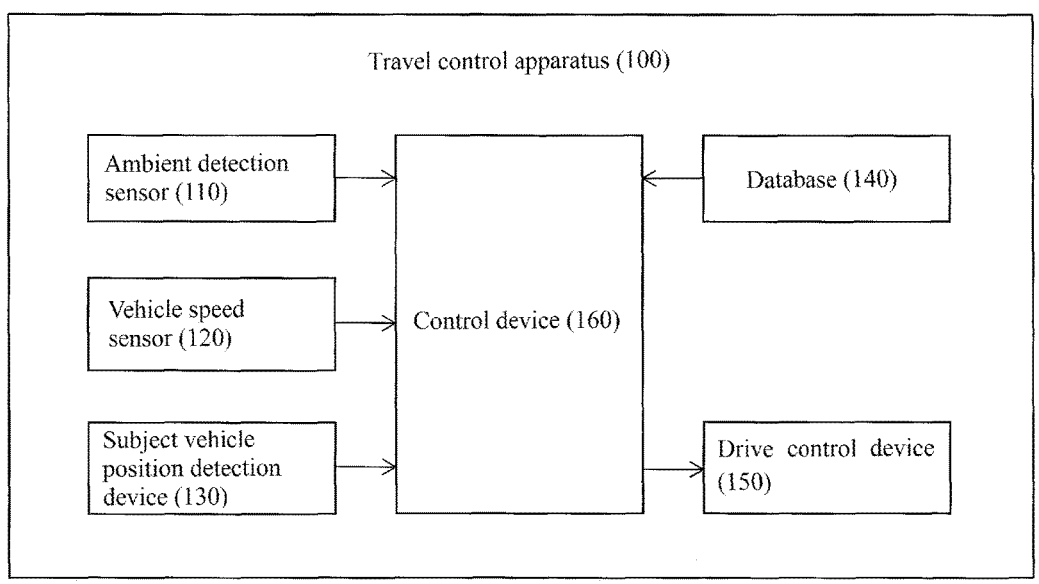
FIG. 1 is a block diagram illustrating a travel control apparatus for a vehicle according to one or more embodiments of the present invention.

FIG. 1 is a block diagram illustrating the configuration of a travel control apparatus for a vehicle 100 according to an embodiment of the present invention. As illustrated in FIG. 1, the travel control apparatus for a vehicle 100 according to the present embodiment includes an ambient detection sensor 110, a vehicle speed sensor 120, a subject vehicle position detection device 130, a database 140, a drive control device 150, and a control device 160. These devices are connected to one another via a controller area network (CAN) or other in-vehicle LAN for mutually exchanging information.

The ambient detection sensor 110 detects objects existing around the subject vehicle. Examples of such an ambient detection sensor 110 include a front camera that captures images ahead of the subject vehicle, a rear camera that captures images behind the subject vehicle, a front radar that detect obstacles ahead of the subject vehicle, a rear radar that detects obstacles behind the subject vehicle, and side radars that detect obstacles existing on the sides of the subject vehicle. Examples of the objects detected by the ambient detection sensor 110 include pedestrians, bicycles, motorbikes, cars, obstacles on a road, traffic signals, road surface signs, and pedestrian crosswalks. The ambient detection sensor 110 may be configured using one sensor of the above-described sensors or may also be configured using a combination of two or more sensors. The detection results of the ambient detection sensor 110 are output to the control device 160.

The vehicle speed sensor 120 measures the rotational speed of a drive system such as a drive shaft or a wheel and detects the traveling speed of the vehicle (also referred to as a "vehicle speed," hereinafter) on the basis of the measured rotational speed. The vehicle speed information detected by the vehicle speed sensor 120 is output to the control device 160.

The subject vehicle position detection device 130 is composed of a GPS unit, a gyro-sensor, and other necessary components. The subject vehicle position detection device 130 detects radio waves transmitted from a plurality of communication satellites using the GPS unit to periodically acquire positional information of the subject vehicle and detects the current position of the subject vehicle on the basis of the acquired positional information of the subject vehicle, angle variation information acquired from the gyro-sensor, and the vehicle speed acquired from the vehicle speed sensor 120. The positional information of the subject vehicle detected by the subject vehicle position detection device 130 is output to the control device 160.

Figure 2:
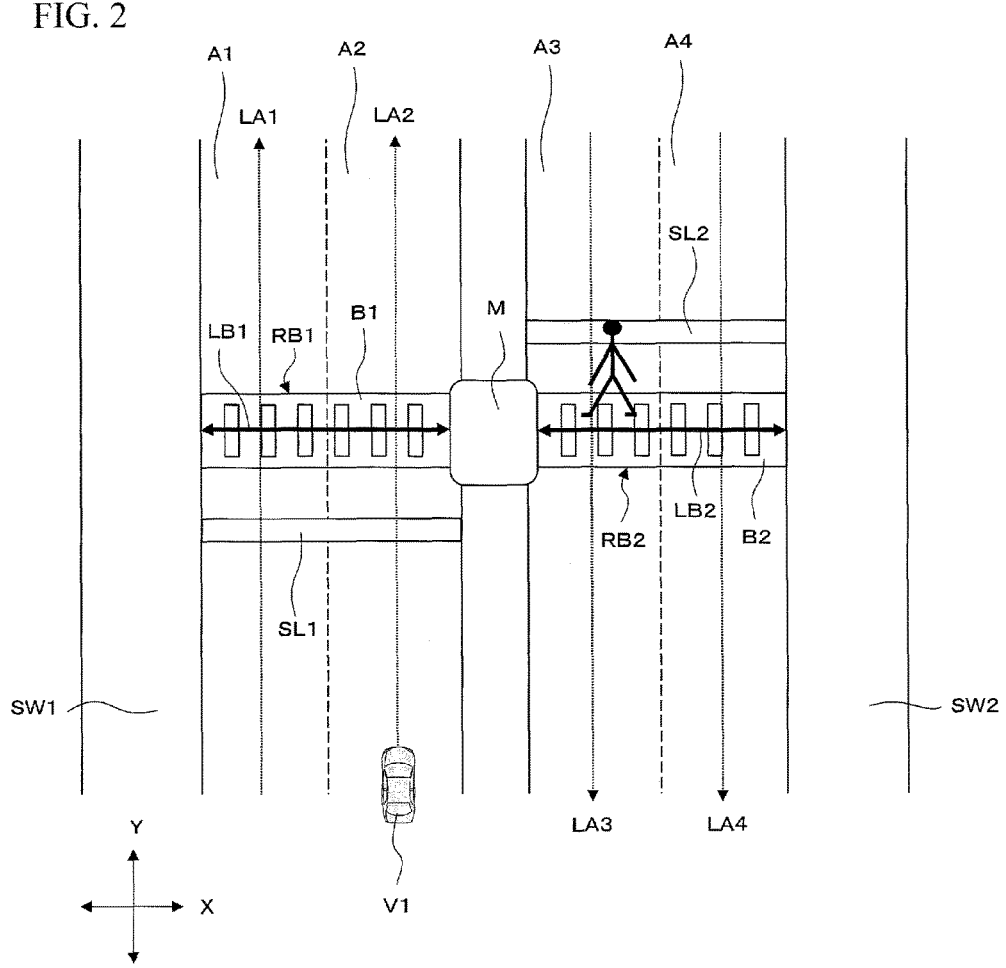
FIG. 2 is a diagram illustrating an example of link information and area information of pedestrian crosswalks possessed by map information.

The database 140 stores map information. The map information includes link information of each of a road on which the vehicle travels, a sidewalk, and a pedestrian crosswalk. FIG. 2 is a diagram for describing the link information of the map information. The link information of a road on which the vehicle travels has one or more links and one or more nodes of each lane as the link information. For example, in the example illustrated in FIG. 2, each of links LA1 to LA4 of lanes A1 to A4 is stored in the database 140 as the link information of a road on which the subject vehicle V1 travels. The link information of each pedestrian crosswalk has one or more links extending in the length direction of the pedestrian crosswalk (i.e. crossing direction of a moving object such as a pedestrian or a bicycle crossing the pedestrian crosswalk) as the link information. For example, in the example illustrated in FIG. 2, links LB1 and LB2 of pedestrian crosswalks B1 and B2 are stored in the database 140 as the link information of the pedestrian crosswalks.

The map information stored in the database 140 also includes area information of pedestrian crosswalks on the map. The shape of the area of a pedestrian crosswalk is not limited to a rectangular shape and may also be other polygonal shape. For example, in the example illustrated in FIG. 2, area information such as the positions and shapes of areas RB1 and RB2 occupied by the pedestrian crosswalks B1 and B2 on the map are stored in the database 140. The map information stored in the database 140 also includes information on road configurations other than pedestrian crosswalks. Examples of such information on road configurations include information on sidewalks, roadside strips, and median strips. For example, in the example illustrated in FIG. 2, sidewalks SW1 and SW2 and a median strip M are stored in the database 140 as the information on the road configurations. In addition, the database 140 has information on lane boundary lines (such as lane marks and curbstones), stop lines, guardrails, road shapes, road curvatures, etc. as the map information. The map information stored in the database 140 is appropriately referred to by the control device 160.

The drive control device 150 controls travel of the subject vehicle. For example, when the subject vehicle is controlled to follow a preceding vehicle (this control will be referred to as "follow-up travel control," hereinafter), the drive control device 150 controls the operation of a drive mechanism (which includes the operation of an internal-combustion engine in the case of an engine car and the operation of an electric motor in the case of an electric car or the like and further includes the torque distribution for an internal-combustion engine and an electric motor in the case of a hybrid car) and the braking operation to achieve the acceleration, deceleration and vehicle speed so that the distance between the subject vehicle and the preceding vehicle can be maintained at a constant distance. When the subject vehicle performs right or left turn, lane change, or the like, the drive control device 150 controls the operation of a steering actuator to control the operation of wheels and thereby executes the steering control of the subject vehicle. The drive control device 150 controls travel of the subject vehicle in accordance with commands sent from the control device 160, which will be described below. Other well-known methods can also be used as a travel control method by the drive control device 150.

The control device 160 is composed of a read only memory (ROM) that stores programs for controlling travel of the subject vehicle, a central processing unit (CPU) that executes the programs stored in the ROM, and a random access memory (RAM) that serves as an accessible storage device. As substitute for or in addition to the CPU, a micro processing unit (MPU), digital signal processor (DSP), application specific integrated circuit (ASIC), field programmable gate array (FPGA), or the like can also be used as an operating circuit.

The control device 160 executes the programs stored in the ROM using the CPU thereby to achieve the following various functions: a subject vehicle information acquisition function of acquiring information on the subject vehicle; an ambient information acquisition function of acquiring the detection results of the ambient detection sensor 110; a route search function of searching for a planned travel route of the subject vehicle; a first pedestrian crosswalk specifying function of specifying a pedestrian crosswalk through which the subject vehicle is expected to pass as a first pedestrian crosswalk; a second pedestrian crosswalk specifying function of specifying a pedestrian crosswalk close to the first pedestrian crosswalk as a second pedestrian crosswalk; an area extension function of extending an area of the first pedestrian crosswalk and an area of the second pedestrian crosswalk; a detection area setting function of setting a detection area; a moving object detection function of detecting a moving object in the detection area; and a travel control function of controlling travel of the subject vehicle on the basis of the detection result of the moving object. These functions of the control device 160 will be described below.

The subject vehicle information acquisition function of the control device 160 is a function capable of acquiring information regarding the subject vehicle as the subject vehicle information. Specifically, the control device 160 can use the subject vehicle information acquisition function to acquire the vehicle speed information of the subject vehicle from the vehicle speed sensor 120 as the subject vehicle information. In addition or alternatively, the control device 160 can use the subject vehicle information acquisition function to acquire information on the current position of the subject vehicle from the subject vehicle position detection device 130 as the subject vehicle information.

The ambient information acquisition function of the control device 160 is a function capable of acquiring the detection results of the ambient detection sensor 110 as the ambient information. For example, the control device 160 can use the ambient information acquisition function to acquire the image information outside the vehicle captured by the front camera and the rear camera and/or the detection results by the front radar, rear radar, and side radars as the ambient information. In addition or alternatively, the control device 160 can use the ambient information acquisition function to perform image analysis on the image information acquired from the cameras and/or perform a clustering process on the point cloud information detected by the radars, thereby acquiring information on the position and/or moving speed of an object existing around the subject vehicle, etc., as the ambient information.

The route search function of the control device 160 is a function capable of searching for a planned travel route of the subject vehicle. For example, when the driver inputs a destination via an input device (not illustrated), the control device 160 can use the route search function to search for a planned travel route of the subject vehicle on the basis of the destination input by the driver, the map information stored in the database 140, and the positional information of the subject vehicle detected by the subject vehicle position detection device 130. The database 140 according to the present embodiment stores the link information of each lane, as illustrated in FIG. 2. The link or links of each lane are preliminarily weighted in accordance with the travel distance, road situation, etc. of the lane (for example, the weighting of links increases as the distance increases or the road situation deteriorates). The control device 160 can use the route search function to specify a lane that is suitable for the travel route from the current position of the subject vehicle to the destination, for example, and correct the weighting of links of the specified lane. For example, when right turn is required to arrive at the destination, the weighting of links of the lane for right turn can be corrected to decrease. Then, the control device 160 can use the route search function to search for a planned travel route that is a route at a lane level in which the total sum of weighting of links is minimum in the lane from the current position of the subject vehicle to the destination, using a graph search algorithm such as Dijkstra's algorithm or A* (A-star) algorithm.

The first pedestrian crosswalk specifying function of the control device 160 is a function capable of specifying a pedestrian crosswalk through which the subject vehicle is expected to pass as a first pedestrian crosswalk on the basis of the planned travel route searched using the route search function and the map information stored in the database 140. For example, the control device 160 can use the first pedestrian crosswalk specifying function to refer to the map information stored in the database 140, thereby acquiring the area information of a pedestrian crosswalk represented by a polygonal shape. Then, when the link of a lane representing the planned travel route of the subject vehicle intersects with the area of a pedestrian crosswalk, the control device 160 can specify the pedestrian crosswalk as the first pedestrian crosswalk using the first pedestrian crosswalk specifying function. For example, in the example illustrate in FIG. 2, the link LA2 of the lane A2 representing the planned travel route of the subject vehicle V1 intersects with the area RB1 of the pedestrian crosswalk B1, and the pedestrian crosswalk B1 is therefore specified as the first pedestrian crosswalk. On the other hand, in the example illustrate in FIG. 2, the link LA2 of the lane A2 representing the planned travel route of the subject vehicle does not intersect with the area RB2 of the pedestrian crosswalk B2, and the pedestrian crosswalk B2 is therefore not specified as the first pedestrian crosswalk.

The method of specifying the first pedestrian crosswalk is not limited to the above method. For example, when the link of a lane determined as the planned travel route of the subject vehicle intersects with the link of a pedestrian crosswalk, the control device 160 can specify the pedestrian crosswalk as the first pedestrian crosswalk using the first pedestrian crosswalk specifying function. For example, in the example illustrate in FIG. 2, the link LA2 of the lane A2 representing the planned travel route of the subject vehicle intersects with the link LB1 of the pedestrian crosswalk B1, and the pedestrian crosswalk B1 is therefore specified as the first pedestrian crosswalk. On the other hand, in the example illustrate in FIG. 2, the link LA2 of the lane A2 representing the planned travel route of the subject vehicle does not intersect with the link LB2 of the pedestrian crosswalk B2, and the pedestrian crosswalk B2 is therefore not specified as the first pedestrian crosswalk. In addition or alternatively, the control device 160 may be configured to use the first pedestrian crosswalk specifying function to acquire an image captured ahead of the subject vehicle from the camera, which captures images ahead of the subject vehicle V1, and perform image analysis thereby to specify the first pedestrian crosswalk.

Figure 3:
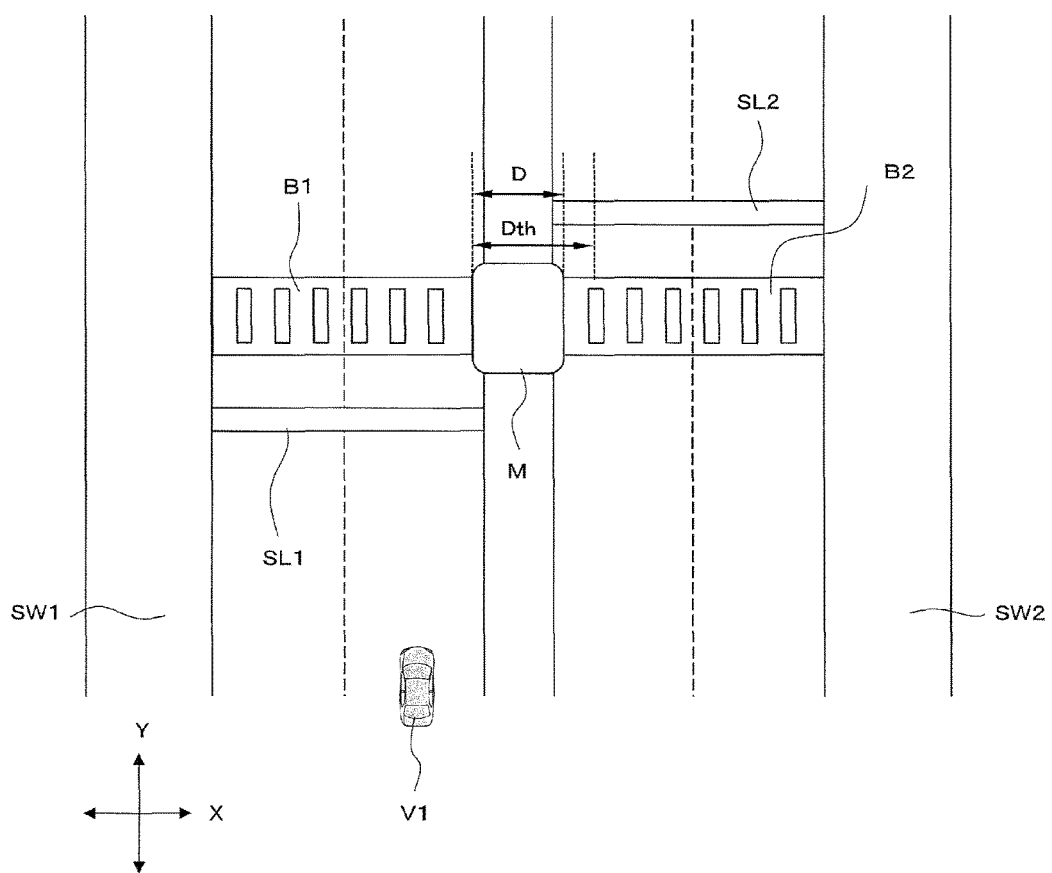
FIG. 3 is a diagram for describing an example of a method of specifying a second pedestrian crosswalk.

The second pedestrian crosswalk specifying function of the control device 160 is a function capable of specifying a pedestrian crosswalk close to the first pedestrian crosswalk as a second pedestrian crosswalk. Specifically, the control device 160 can use the second pedestrian crosswalk specifying function to acquire the positional coordinates of each pedestrian crosswalk from the map information. Then, as illustrated in FIG. 3, the control device 160 can use the second pedestrian crosswalk specifying function to specify a pedestrian crosswalk to which a distance D from the first pedestrian crosswalk (distance D from the end part of the first pedestrian crosswalk) is a predetermined distance Dth or less in the length direction of the first pedestrian crosswalk as the second pedestrian crosswalk on the basis of the acquired positional coordinates of the pedestrian crosswalk. FIG. 3 is a diagram for describing an example of a method of specifying the second pedestrian crosswalk. For example, in the example illustrated in FIG. 3, the pedestrian crosswalk B1 is specified as the first pedestrian crosswalk. In this case, the second pedestrian crosswalk specifying function serves to determine whether or not a pedestrian crosswalk exists to which the distance D from the first pedestrian crosswalk B1 is the predetermined distance Dth or less in the length direction (X-direction) of the first pedestrian crosswalk B1. In the example illustrated in FIG. 3, the distance D from the first pedestrian crosswalk B1 to the pedestrian crosswalk B2 is not more than the predetermined distance Dth. The control device 160 can therefore specify the pedestrian crosswalk B2 as the second pedestrian crosswalk using the second pedestrian crosswalk specifying function. Although not illustrated, when the distance D from a position of intersection P to a pedestrian crosswalk is the predetermined distance Dth or more, the pedestrian crosswalk is not specified as the second pedestrian crosswalk.

The area extension function of the control device 160 is a function capable of extending a first pedestrian crosswalk area corresponding to the first pedestrian crosswalk and a second pedestrian crosswalk area corresponding to the second pedestrian crosswalk. An example of a method of extending the first pedestrian crosswalk area will be described below with reference to FIG. 4 to FIG. 8. As will be understood, extension of the second pedestrian crosswalk area can also be performed using the same method as the method of extending the first pedestrian crosswalk area.

Figure 4:
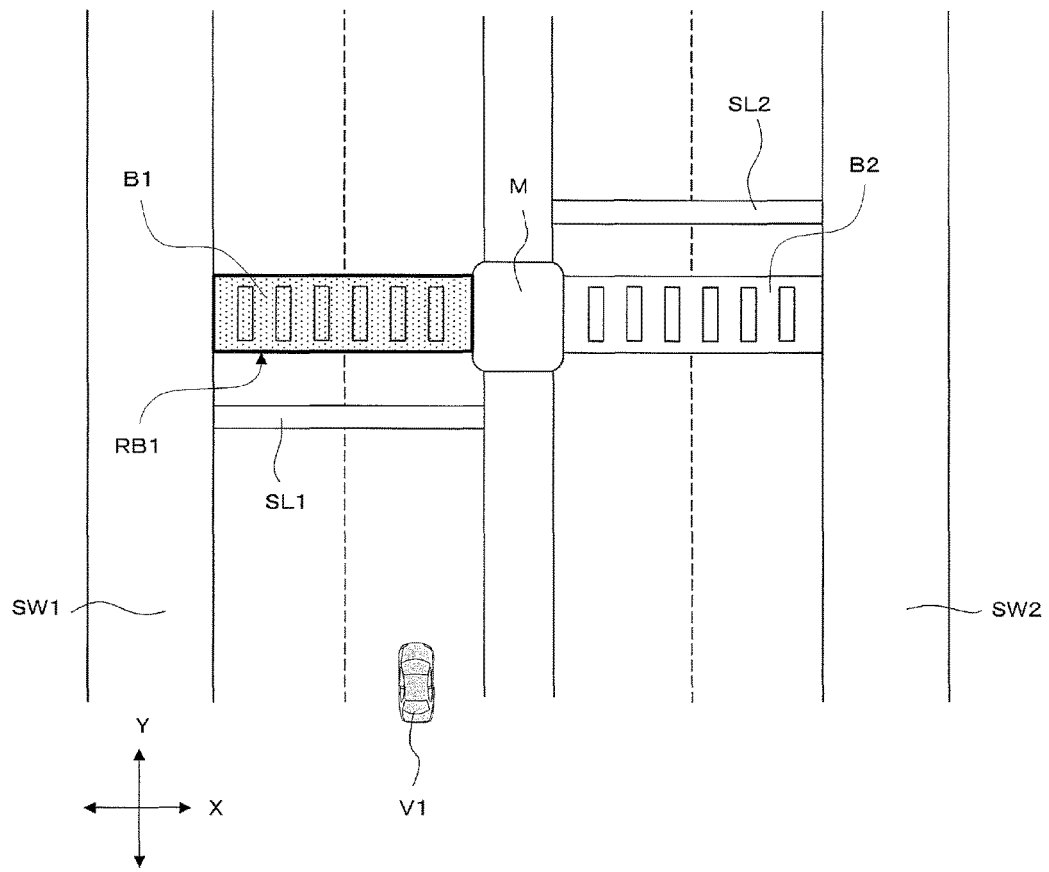
FIG. 4 is a diagram for describing an example of a first pedestrian crosswalk area.

The control device 160 can use the area extension function first to specify an area of the first pedestrian crosswalk on the map as the first pedestrian crosswalk area. FIG. 4 is a diagram for describing the first pedestrian crosswalk area.

For example, in the example illustrated in FIG. 4, the control device 160 can use the area extension function to set an area RB1 of the first pedestrian crosswalk B1 on the map as the first pedestrian crosswalk area. In addition or alternatively, the control device 160 can use the area extension function to detect the area RB1, which the first pedestrian crosswalk B1 occupies on the road, on the basis of the image data captured ahead of the subject vehicle and acquired from the ambient detection sensor 110 and set the area RB1 as the first pedestrian crosswalk area.

Figure 5:
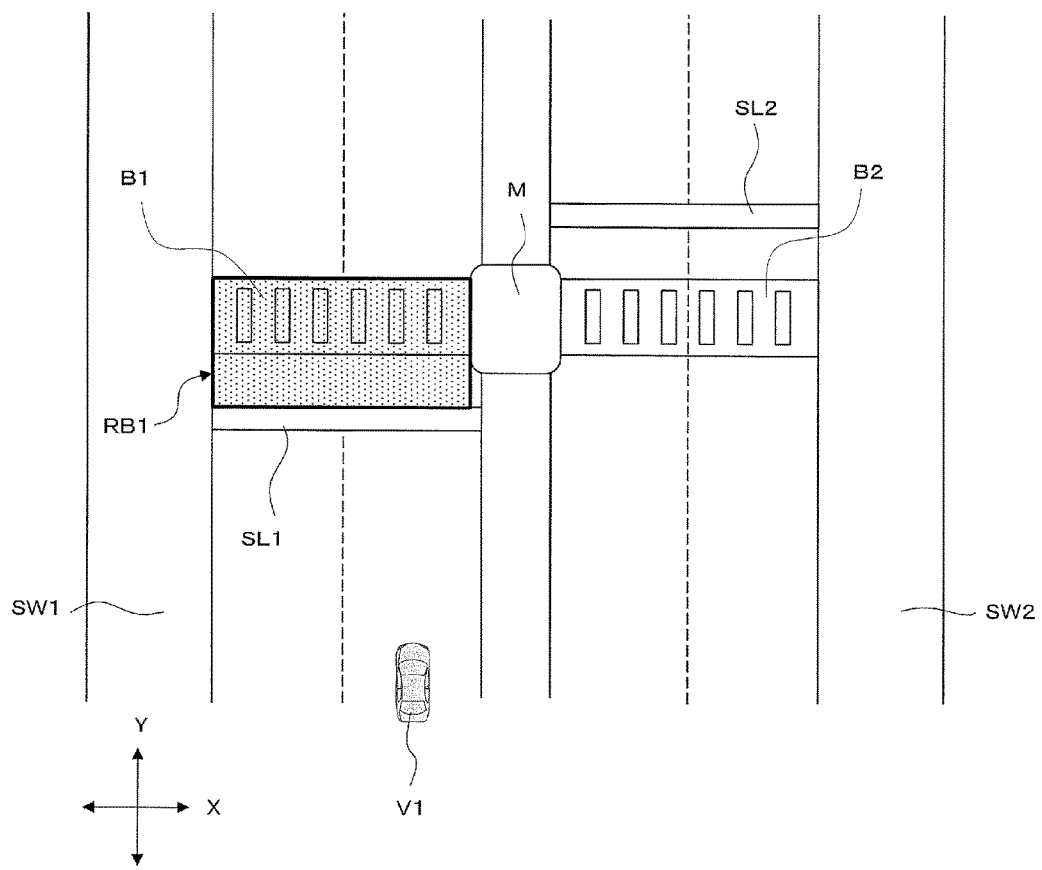
FIG. 5 is a diagram illustrating an example of the first pedestrian crosswalk area extended to a stop line.

When a stop line exist before the first pedestrian crosswalk, the control device 160 can use the area extension function to extend the first pedestrian crosswalk area to the position of the stop line in the width direction of the first pedestrian crosswalk. FIG. 5 is a diagram illustrating an example of the first pedestrian crosswalk area when a stop line exists. For example, in the example illustrated in FIG. 5, a stop line SL1 exists before the first pedestrian crosswalk B1, and the control device 160 can therefore use the area extension function to extend the first pedestrian crosswalk area RB1 to the position of the stop line SL1 in the width direction (Y-direction) of the first pedestrian crosswalk.

Figure 6:
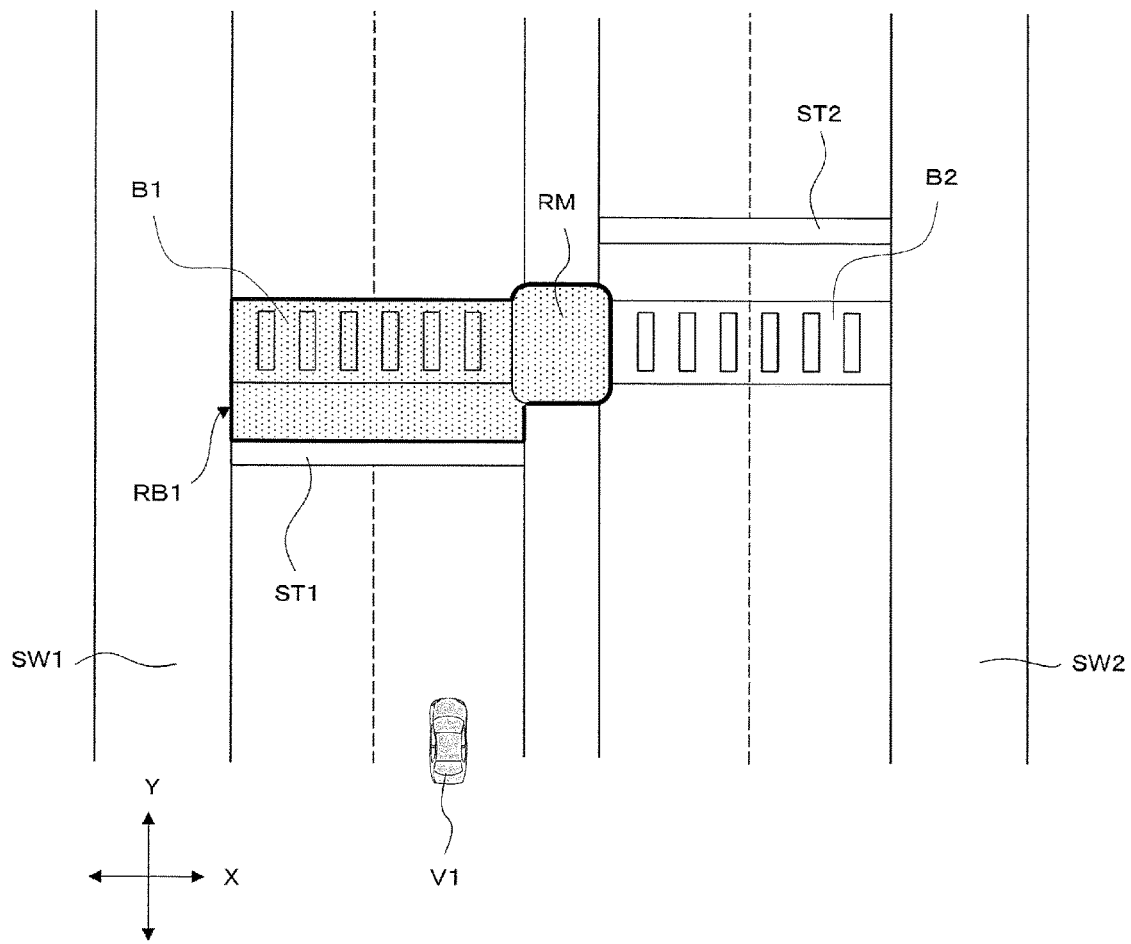
FIG. 6 is a diagram illustrating an example of the first pedestrian crosswalk area extended into a median strip.

When the first pedestrian crosswalk is adjacent to a median strip, the control device 160 can use the area extension function to extend the first pedestrian crosswalk area in the length direction of the first pedestrian crosswalk so that the first pedestrian crosswalk area includes a certain area of the median strip. FIG. 6 is a diagram illustrating an example of the first pedestrian crosswalk area extended into a median strip in the scene illustrated in FIG. 5. For example, in the example illustrated in FIG. 6, the first pedestrian crosswalk B1 is adjacent to a median strip M, and the control device 160 can therefore use the area extension function to extend the first pedestrian crosswalk area RB1 in the length direction (X-direction) of the first pedestrian crosswalk so that the first pedestrian crosswalk area RB1 includes a certain area RM of the median strip M.

Figure 7:
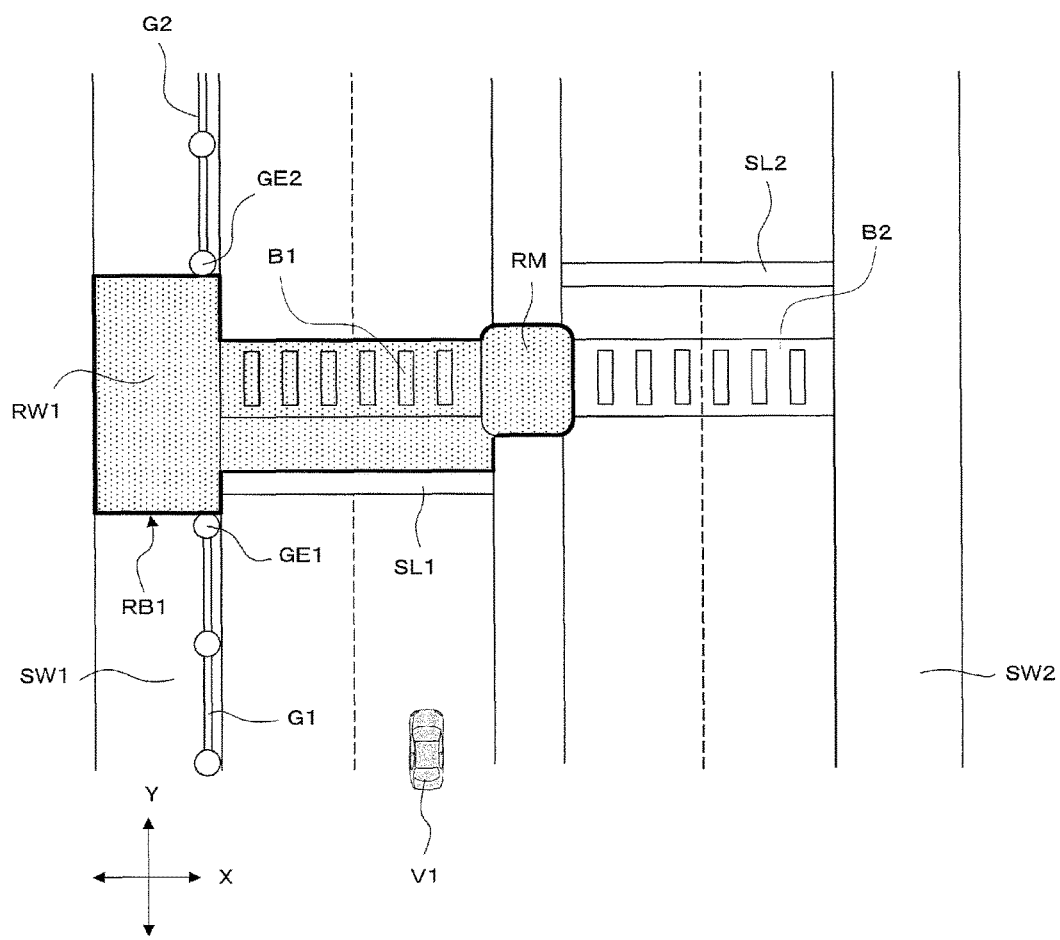
FIG. 7 is a diagram illustrating an example of the first pedestrian crosswalk area when guardrails exist on a sidewalk.

When the first pedestrian crosswalk is adjacent to a sidewalk, the control device 160 can use the area extension function to extend the first pedestrian crosswalk area into the sidewalk. Specifically, the control device 160 can use the area extension function to extend the first pedestrian crosswalk area in the length direction of the first pedestrian crosswalk to an end part of the sidewalk adjacent to the first pedestrian crosswalk. The end part of the sidewalk is located on the opposite side to the first pedestrian crosswalk. FIG. 7 is a diagram illustrating an example of the first pedestrian crosswalk area when guardrails exist on the sidewalk in the scene illustrated in FIG. 6. For example, in the example illustrated in FIG. 7, the first pedestrian crosswalk B1 is adjacent to the sidewalk SW1. The control device 160 can therefore use the area extension function to extend the first pedestrian crosswalk area RB1 in the length direction (X-direction) of the first pedestrian crosswalk B1 to the end part of the sidewalk SW1 opposite to the first pedestrian crosswalk B1, as illustrated in FIG. 7.

In the case of extending the first pedestrian crosswalk area into a sidewalk, when a guardrail is installed at the sidewalk, the control device 160 can use the area extension function to extend an area of the first pedestrian crosswalk area within the sidewalk to the installation position of the guardrail in the width direction of the first pedestrian crosswalk. For example, in the example illustrated in FIG. 7, guardrails G1 and G2 are installed at the sidewalk SW1 adjacent to the first pedestrian crosswalk B1. The control device 160 can therefore use the area extension function to extend an area RW1 of the first pedestrian crosswalk area RB1 corresponding to the sidewalk to installation positions GE1 and GE2 of the guardrails in the width direction (Y-direction) of the first pedestrian crosswalk B1, as illustrated in FIG. 7.

Figure 8:
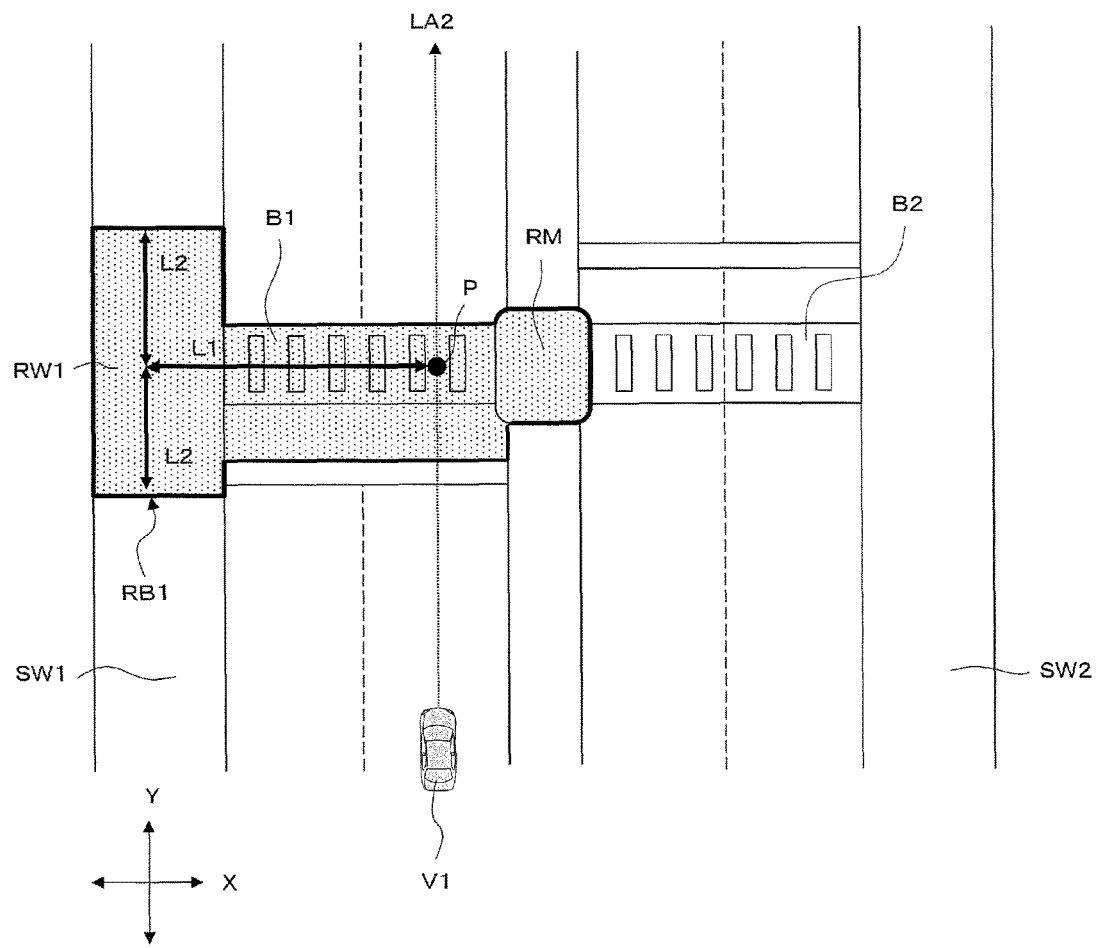
FIG. 8 is a diagram illustrating an example of the first pedestrian crosswalk area when no guardrails exist on a sidewalk.

In the case of extending the first pedestrian crosswalk area into a sidewalk, when no guardrails are installed at the sidewalk, the control device 160 can use the area extension function to extend an area of the first pedestrian crosswalk area within the sidewalk on the basis of a distance in which a moving object moves until the subject vehicle reaches the first pedestrian crosswalk. This will be described below with reference to FIG. 8. FIG. 8 is a diagram illustrating an example of the first pedestrian crosswalk area when no guardrails exist on the sidewalk.

For example, as illustrated in FIG. 8, the control device 160 uses the area extension function to calculate a position on the first pedestrian crosswalk B1 which intersects with the planned travel route of the subject vehicle V1, as a position of intersection P in the length direction (X-direction) of the first pedestrian crosswalk B1. In addition, the control device 160 uses the area extension function to calculate an estimated time for arrival T for the subject vehicle V1 to reach the position of intersection P as $T=L/V$ ... (1) on the basis of the speed V of the subject vehicle V1 and the distance L from the subject vehicle V1 to the position of intersection P. Further, the control device 160 uses the area extension function to acquire an average moving speed Vp (e.g. 80 m/min) of a pedestrian stored in the ROM of the control device 160.

Here, a required time Tp for a pedestrian to reach the position of intersection P can be calculated as $Tp=(L1+L2)/Vp$ ... (2). As illustrated in FIG. 8, L1 in the above equation (2) represents a distance in which a moving object moves on the first pedestrian crosswalk B1 in the length direction (X-direction) of the first pedestrian crosswalk B1, and this distance is included in a distance in which the moving object moves until the subject vehicle V1 reaches the first pedestrian crosswalk B1. L2 in the above equation (2) represents a distance in which the moving object moves on the sidewalk SW1 in the width direction (Y-direction) of the first pedestrian crosswalk B1, and this distance is also included in the distance in which the moving object moves until the subject vehicle V1 reaches the first pedestrian crosswalk B1. The moving object refers to an object that crosses a pedestrian crosswalk, such as a pedestrian and a bicycle.

When the required time Tp for a moving object to reach the position of intersection P is not more than the required time for arrival T for the subject vehicle V1 to reach the position of intersection P ($T \geq Tp$), the subject vehicle V1 and the moving object may come close to each other at the position of intersection P of the first pedestrian crosswalk. In other words, when $T \geq (L1+L2)/Vp$ ... (3) is satisfied with reference to the above equation (2), the subject vehicle V1 and the moving object may come close to each other. The control device 160 therefore uses the area extension function to calculate the maximum value of L2 satisfying the above expression (3) as a distance L2 with which the area RW1 of the first pedestrian crosswalk area RB1 corresponding to the sidewalk is extended in the width direction (Y-direction) of the first pedestrian crosswalk B1. The above expression (3) is deformed to $L2 \leq Vp \times (L/V) - L1$ using the above equation (1); therefore, the maximum value of L2 can be calculated as $L2=Vp \times (L/V) - L1$. Then, the control device 160 can use the area extension function to extend the area RW1 of the first pedestrian crosswalk area RB1 corresponding to the sidewalk by the calculated L2 in the width direction (Y-direction) of the first pedestrian crosswalk.

As in the same method for the first pedestrian crosswalk area, the control device 160 can use the area extension function to specify an area of the second pedestrian crosswalk area as the second pedestrian crosswalk area and extend the specified second pedestrian crosswalk area. The method of extending the second pedestrian crosswalk area is the same as the method of extending the first pedestrian crosswalk area, so the description will be omitted.

Figure 9:
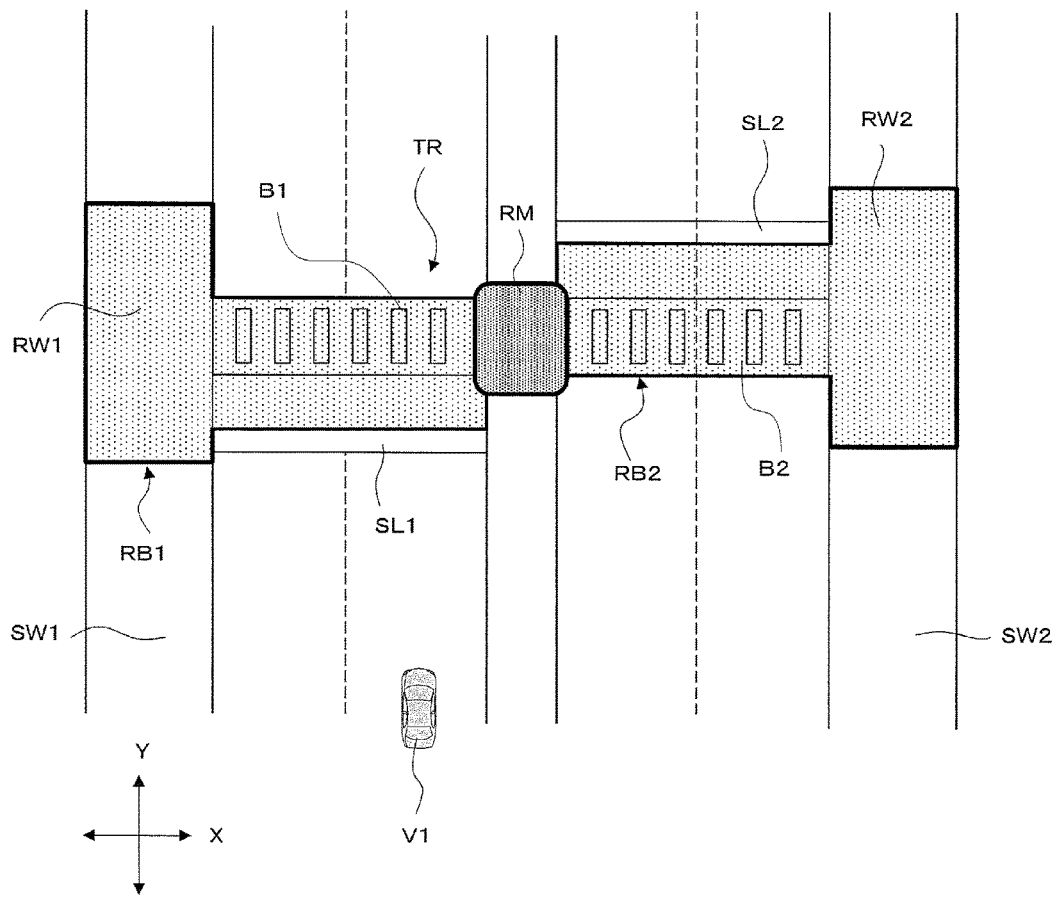
FIG. 9 is a diagram illustrating an example of a detection area.

The detection area setting function of the control device 160 is a function capable of setting the detection area for detecting moving objects. Specifically, after the first pedestrian crosswalk area and the second pedestrian crosswalk area are extended, the control device 160 can use the detection area setting function to determine whether or not at least a part of the first pedestrian crosswalk area and at least a part of the second pedestrian crosswalk area overlap each other. When at least a part of the first pedestrian crosswalk area and at least a part of the second pedestrian crosswalk area overlap each other, the control device 160 can use the detection area setting function to set an area comprising the first pedestrian crosswalk area and the second pedestrian crosswalk area as the detection area. When at least a part of the first pedestrian crosswalk area and at least a part of the second pedestrian crosswalk area do not overlap each other, the control device 160 can use the detection area setting function to set only the first pedestrian crosswalk area as the detection area. For example, in the example illustrated in FIG. 9, a part of the extended first pedestrian crosswalk area RB1 and a part of the extended second pedestrian crosswalk area RB2 overlap each other in the area RM of the median strip M, and the detection area setting function can therefore serve to set an area (RB1+RB2) in which the first pedestrian crosswalk area RB1 and the second pedestrian crosswalk area RB2 are combined, as the detection area RT.

The moving object detection function of the control device 160 is a function capable of detecting a moving object in the detection area which is set using the detection area setting function. Specifically, the control device 160 can use the moving object detection function to detect a moving object using only the detection result in the detection area RT among the detection results detected by the ambient detection sensor 110 around the subject vehicle.

The travel control function of the control device 160 is a function capable of controlling the automated driving travel of the subject vehicle. Specifically, the control device 160 can use the travel control function to automatically execute the driving operation, which is ordinarily performed by the driver, through operating the drive control device 150 to control the driving mechanisms such as an engine and a brake and the steering mechanism such as a steering actuator on the basis of the detection results of the ambient detection sensor 110 and given travel conditions (such as traffic rules and a planned travel route). For example, the control device 160 can use the travel control function to perform the lane keeping control, which controls the traveling position of the subject vehicle in the width direction, through operating the drive control device 150 to control the operation of the steering actuator or the like so that the subject vehicle travels in a certain lane. In addition or alternatively, the control device 160 can use the travel control function to perform the follow-up travel control, which is for automatically following a preceding vehicle, through operating the drive control device 150 to control the operation of the driving mechanisms such as an engine and a brake so that the subject vehicle travels with a certain distance from the preceding vehicle. In addition or alternatively, the control device 160 can use the travel control function to automatically execute the right or left turn at an intersection, lane change, parking, stopping, and other necessary actions through controlling the driving mechanisms such as an engine and a brake and the steering mechanism such as a steering actuator on the basis of the detection results of the ambient detection sensor 110 and the given travel conditions. For example, in the present embodiment, when a moving object is detected in the detection area using the moving object detection function, the control device 160 can use the travel control function to control the driving mechanisms such as an engine and a brake thereby to stop the subject vehicle before a pedestrian crosswalk.

Figure 10:
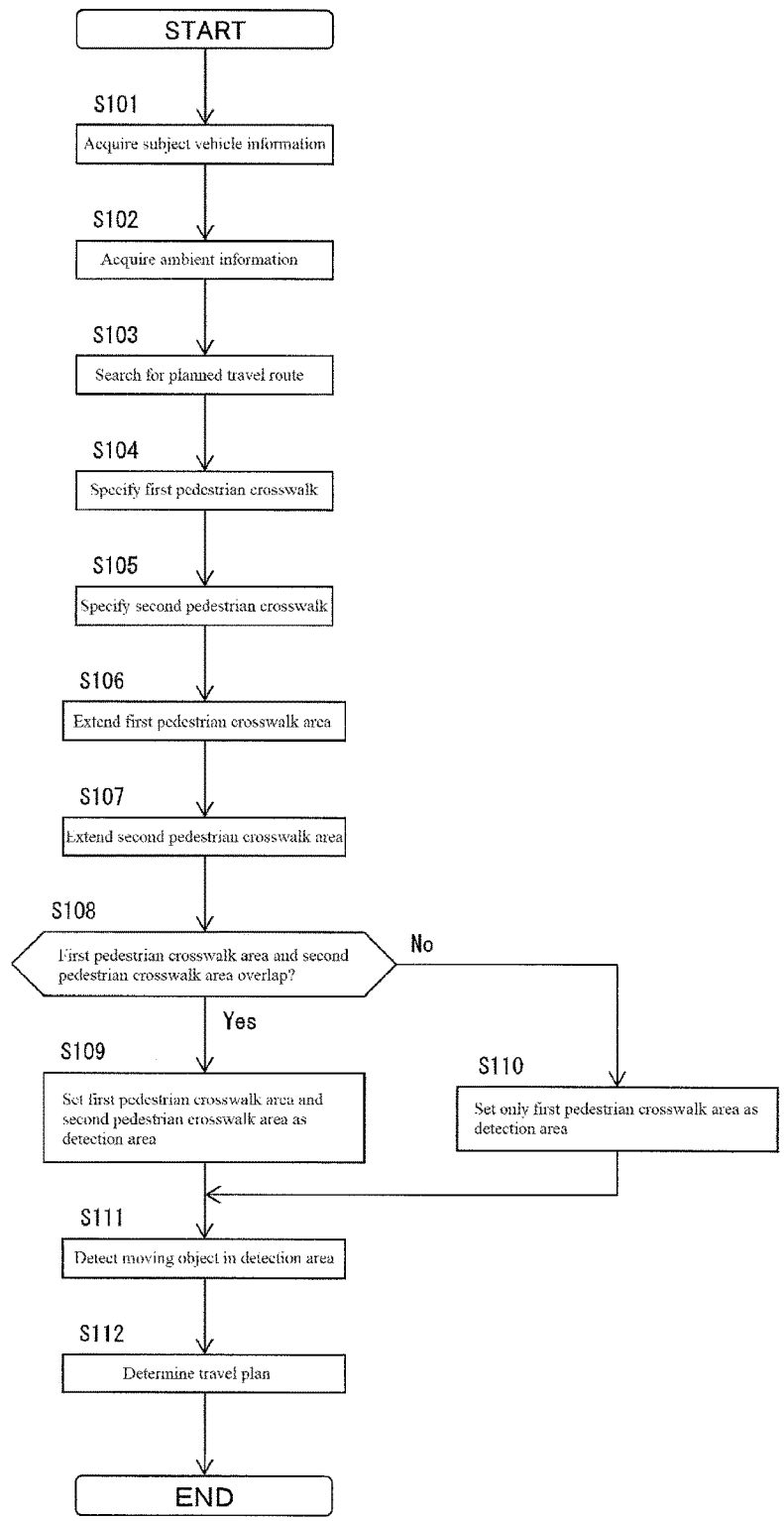
FIG. 10 is a flowchart illustrating an example of the travel control process according to a first embodiment of the present invention.

A travel control process according to the first embodiment will now be described with reference to FIG. 10. FIG. 10 is a flowchart illustrating an example of the travel control process according to the first embodiment. The travel control process described below is executed by the control device 160. The travel control process described below is executed repeatedly at regular time intervals.

First, in step S101, the subject vehicle information acquisition function serves to acquire the subject vehicle information which includes the vehicle speed information and position information of the subject vehicle. In step S102, the ambient information acquisition function serves to acquire the detection results of the ambient detection sensor 110 as the ambient information.

In step S103, the route search function serves to search for a planned travel route of the subject vehicle. For example, when the driver inputs a destination via an input device (not illustrated), the control device 160 can use the route search function to search for a route at a lane level on which the subject vehicle travels to the destination as the planned travel route on the basis of the map information stored in the database 140.

In step S104, the first pedestrian crosswalk specifying function serves to specify a first pedestrian crosswalk. For example, when the planned travel route searched in step S103 intersects with the area of a pedestrian crosswalk included in the map information stored in the database 140, the control device 160 can use the first pedestrian crosswalk specifying function to specify the pedestrian crosswalk as the first pedestrian crosswalk.

In step S105, the second pedestrian crosswalk specifying function serves to specify a pedestrian crosswalk close to the first pedestrian crosswalk as a second pedestrian crosswalk. For example, as illustrated in FIG. 3, the control device 160 can use the second pedestrian crosswalk specifying function to specify the pedestrian crosswalk B2 to which the distance D from the first pedestrian crosswalk B1 (distance D from the end part of the first pedestrian crosswalk B1) is the predetermined distance Dth or less as the second pedestrian crosswalk.

In step S106, the area extension function serves to extend the first pedestrian crosswalk area. Specifically, as illustrated in FIG. 4, the control device 160 uses the area extension function first to set an area corresponding to the first pedestrian crosswalk as the first pedestrian crosswalk area. When the stop line SL1 exists before the first pedestrian crosswalk B1 as illustrate in FIG. 5, the control device 160 uses the area extension function to extend the first pedestrian crosswalk area RB1 to the position of the stop line in the width direction (Y-direction) of the first pedestrian crosswalk B1. In addition or alternatively, when the median strip M adjacent to the first pedestrian crosswalk B1 exists as illustrated in FIG. 6, the control device 160 uses the area extension function to extend the first pedestrian crosswalk area RB1 into the area RM of the median strip M in the length direction (X-direction) of the first pedestrian crosswalk B1. In addition or alternatively, when the sidewalk SW1 adjacent to the first pedestrian crosswalk B1 exists as illustrated in FIG. 7, the control device 160 uses the area extension function to extend the first pedestrian crosswalk area RB1 to the end part of the sidewalk SW1 opposite to the first pedestrian crosswalk in the length direction (X-direction) of the first pedestrian crosswalk B1. In this case, the control device 160 may use the area extension function to extend the area RW1 of the first pedestrian crosswalk area RB1 corresponding to the sidewalk SW1 in the width direction (Y-direction) of the first pedestrian crosswalk B1 to the end part positions GE1 and GE2 of the guardrails G1 and G2 on the first pedestrian crosswalk B1 side or to positions defined by the distance L2 in which a moving object can reach the first pedestrian crosswalk B1 before the subject vehicle V1 reaches the first pedestrian crosswalk B1.

In step S107, the area extension function serves to extend the second pedestrian crosswalk area. The method of extending the second pedestrian crosswalk area can be carried out as in step S106.

In step S108, the detection area setting function serves to set the detection area. Specifically, the control device 160 uses the detection area setting function to determine whether or not a part of the first pedestrian crosswalk area set in step S106 and a part of the second pedestrian crosswalk area set in step S107 overlap each other. Then, when a determination is made that a part of the first pedestrian crosswalk area and a part of the second pedestrian crosswalk area overlap each other, the routine proceeds to step S109 in which the detection area setting function serves to set the area including the first pedestrian crosswalk B1 and the second pedestrian crosswalk B2 as the detection area RT. The area which is set as the detection area RT in this case is an area that includes at least the first pedestrian crosswalk B1 and the second pedestrian crosswalk B2. Such areas may be the first pedestrian crosswalk B1 and second pedestrian crosswalk B2 in themselves before the extension process is performed using the area extension function of the control device 160 or may also be the first pedestrian crosswalk area RB1 and second pedestrian crosswalk area RB2 which are extended using the area extension function. When a determination is made that a part of the first pedestrian crosswalk area and a part of the second pedestrian crosswalk area do not overlap each other, the routine proceeds to step S110 in which the detection area setting function serves to set only an area including the first pedestrian crosswalk B1 as the detection area RT. The area which is set as the detection area RT in this case is an area that includes at least the first pedestrian crosswalk B1. Such an area may be the first pedestrian crosswalk B1 in itself before the extension process is performed using the area extension function of the control device 160 or may also be the first pedestrian crosswalk area RB1 extended using the area extension function.

In step S111, the moving object detection function serves to detect a moving object in the detection area which is set in step S109 or step S110. In step S112, the travel control function serves to determine a travel plan of the subject vehicle on the basis of the detection result of the moving object in step S111 and perform the travel control. For example, in the present embodiment, when a moving object is detected in the detection area, control is performed to stop the subject vehicle before the first pedestrian crosswalk.

As described above, in the first embodiment, the first pedestrian crosswalk area corresponding to the first pedestrian crosswalk through which the subject vehicle is expected to pass and the second pedestrian crosswalk area corresponding to the second pedestrian crosswalk located within a predetermined distance from the first pedestrian crosswalk are extended, and the first pedestrian crosswalk area and the second pedestrian crosswalk area are set. Then, when a part of the first pedestrian crosswalk area and a part of the second pedestrian crosswalk area overlap each other, the first pedestrian crosswalk area and the second pedestrian crosswalk area are set as the detection area, and a moving object is detected in the detection area. Through this operation in the first embodiment, the moving object can be detected not only in the first pedestrian crosswalk through which the subject vehicle is expected to pass, but also in the second pedestrian crosswalk close to the first pedestrian crosswalk. As a result, the moving object which may come close to the subject vehicle when the subject vehicle reaches the first pedestrian crosswalk can be appropriately detected at timing before the moving object crosses the first pedestrian crosswalk. For example, when the subject vehicle performs automated driving, the travel plan of the subject vehicle can be created at earlier timing and it is therefore possible to perform the automated driving with a more margin. Moreover, in the process of determining a close pedestrian crosswalk to be taken into account in the present embodiment, it suffices only to determine whether areas of pedestrian crosswalks overlap each other when extended, and a complicated process therefore need not be performed. It is thus possible to reduce the time to determine an action and more improve the safety.

In the first embodiment, when stop lines exist before the first pedestrian crosswalk and the second pedestrian crosswalk, the first pedestrian crosswalk area and the second pedestrian crosswalk area are extended to the positions of respective stop lines. This allows for appropriate detection of a moving object that moves between the first pedestrian crosswalk and the stop line or between the second pedestrian crosswalk and the stop line, that is, a moving object that may come close to the subject vehicle in the vicinity of the first pedestrian crosswalk.

When the first pedestrian crosswalk area and the second pedestrian crosswalk area are close to sidewalks, the first pedestrian crosswalk area and the second pedestrian crosswalk area are each extended into a sidewalk close thereto. This allows for appropriate detection of a moving object that moves on the sidewalk to cross the first pedestrian crosswalk. In the case of extending each of the first pedestrian crosswalk area and the second pedestrian crosswalk area into a sidewalk close thereto, when the guardrails G1 and G2 are installed at the sidewalk SW1 as illustrated in FIG. 7, the area RW1 of the first pedestrian crosswalk area RB1 (or the second pedestrian crosswalk RB2) corresponding to the sidewalk SW1 is extended to the positions of end parts GE1 and GE2 of the guardrails G1 and G2 on the first pedestrian crosswalk B1 side in the width direction (Y-direction) of the first pedestrian crosswalk B1. This allows for appropriate detection of moving objects that detour along the guardrails to cross the first pedestrian crosswalk. In addition or alternatively, as illustrated in FIG. 8, areas of the first pedestrian crosswalk area RB1 and the second pedestrian crosswalk area RB2 corresponding to the sidewalks SW1 and SW2 are extended on the basis of the moving distances L2 in which moving objects move until the subject vehicle reaches the first pedestrian crosswalk B1. This allows for appropriate detection of moving objects that may come close to the subject vehicle when the subject vehicle reaches the first pedestrian crosswalk.

In the present embodiment, when a median strip exists between the first pedestrian crosswalk and the second pedestrian crosswalk, the first pedestrian crosswalk area and the second pedestrian crosswalk area are extended into the median strip. This allows for appropriate detection of a moving object that moves on the median strip toward the first pedestrian crosswalk.

Second Embodiment

A travel control apparatus for a vehicle according to a second embodiment of the present invention will then be described. The travel control apparatus 100 for a vehicle according to the second embodiment has the same configuration as that in the first embodiment except that it operates as follows.

The control device 160 according to the second embodiment has a crossing possibility determination function of determining whether a moving object can cross the second pedestrian crosswalk in addition to the functions of the first embodiment. For example, the crossing possibility determination function includes a function capable of acquiring the captured image of a traffic signal for pedestrians at the second pedestrian crosswalk from a camera attached to the subject vehicle. Then, the control device 160 can use the crossing possibility determination function to determine the signal indication (lighting of red or green or blinking of green) of the traffic signal for pedestrians at the second pedestrian crosswalk on the basis of the acquired captured image. In an alternative configuration, the control device 160 may use the crossing possibility determination function to estimate the signal indication of the traffic signal for pedestrians at the second pedestrian crosswalk on the basis of the signal indication (such as red, yellow, or green) of a traffic signal for vehicles that is located before the second pedestrian crosswalk. In this configuration, for example, the control device 160 may use the crossing possibility determination function to acquire the correspondence relationship between the signal indication of the traffic signal for vehicles and the signal indication of the traffic signal for pedestrians from the ROM of the control device 160 or from an external server and refer to the correspondence relationship to estimate the signal indication of the traffic signal for pedestrians at the second pedestrian crosswalk from the signal indication of the traffic signal for vehicles at the second pedestrian crosswalk. In another configuration, the control device 160 may use the crossing possibility determination function to acquire probe information including information on the signal indication of the traffic signal for pedestrians at the second pedestrian crosswalk from another vehicle or from an external server thereby to determine the signal indication of the traffic signal for pedestrians at the second pedestrian crosswalk.

The control device 160 can use the crossing possibility determination function to determine that a moving object cannot cross the second pedestrian crosswalk when an obstacle exists on the second pedestrian crosswalk, such as when another vehicle is parked on the second pedestrian crosswalk. In addition or alternatively, the control device 160 can use the crossing possibility determination function to determine that a moving object cannot cross the second pedestrian crosswalk when a surrounding vehicle traveling around the subject vehicle passes through the second pedestrian crosswalk so that the moving object cannot cross the second pedestrian crosswalk.

Then, the control device 160 can use the detection area setting function to set the detection area on the basis of the determination result by the crossing possibility determination function. For example, when the crossing possibility determination function serves to determine that crossing of the second pedestrian crosswalk is possible, the control device 160 can use the detection area setting function to set an area that includes the first pedestrian crosswalk area corresponding to the first pedestrian crosswalk and the second pedestrian crosswalk area corresponding to the second pedestrian crosswalk, as the detection area. On the other hand, when the crossing possibility determination function serves to determine that crossing of the second pedestrian crosswalk is not possible, the control device 160 can use the detection area setting function to set only the first pedestrian crosswalk area as the detection area.

Figure 11:
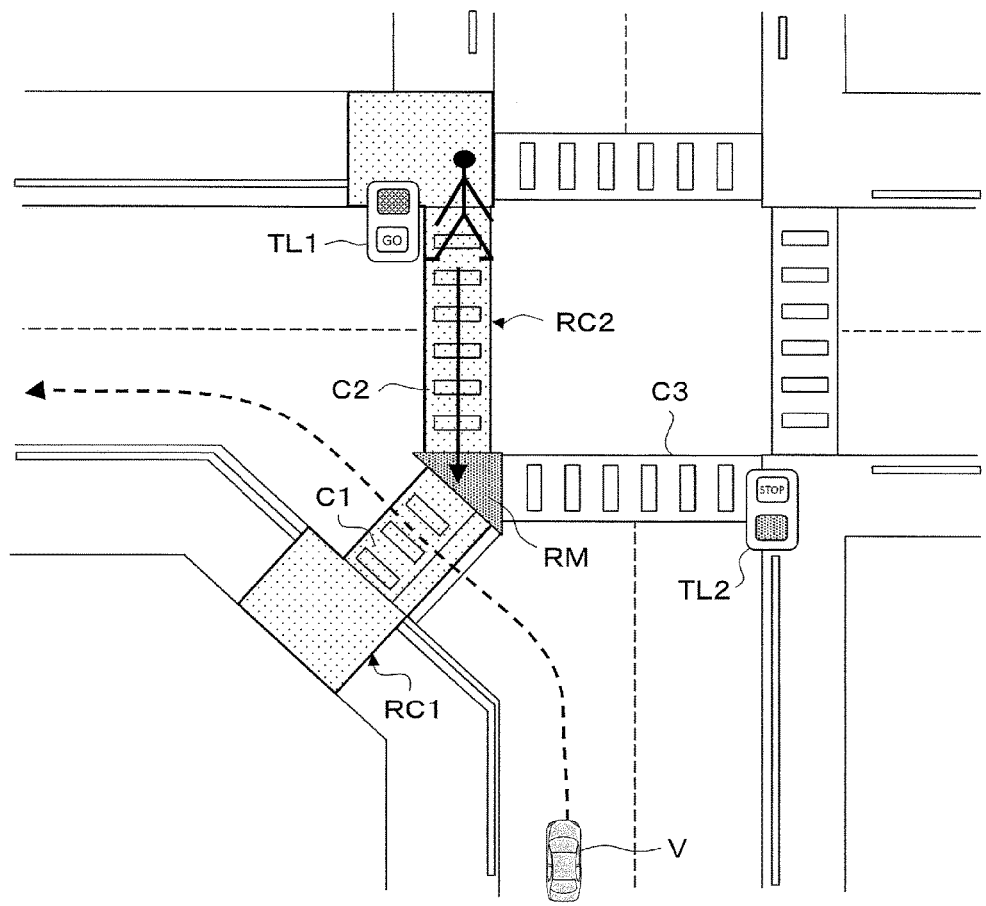
FIG. 11 is a diagram (part 1) illustrating an example of the detection area in a second embodiment of the present invention.

FIG. 11 is a diagram for describing an example of a method of setting the detection area in the second embodiment. For example, in the example illustrated in FIG. 11, a pedestrian crosswalk C1 is specified as the first pedestrian crosswalk through which the subject vehicle V1 is expected to pass, and pedestrian crosswalks C2 and C3 are specified as the second pedestrian crosswalks close to the first pedestrian crosswalk C1. Further, in the example illustrated in FIG. 11, a traffic signal for pedestrians TL1 at the second pedestrian crosswalk C2 indicates a signal representing that a moving object can cross the second pedestrian crosswalk C2 while a traffic signal for pedestrians TL2 at the second pedestrian crosswalk C3 indicates a signal representing that a moving object cannot cross the second pedestrian crosswalk C3. In this case, the crossing possibility determination function can serve to determine that crossing of the second pedestrian crosswalk C2 is possible and crossing of the second pedestrian crosswalk C3 is not possible.

Accordingly, the control device 160 uses the detection area setting function to determine whether or not a part of the first pedestrian crosswalk area RC1 of the first pedestrian crosswalk C1 and a part of the second pedestrian crosswalk area RC2 of the second pedestrian crosswalk C2 overlap each other. In the example illustrated in FIG. 11, a part of the first pedestrian crosswalk area RC1 and a part of the second pedestrian crosswalk area RC2 overlap each other in an area RM of the median strip. The control device 160 therefore uses the detection area setting function to set the first pedestrian crosswalk area RC1 and the second pedestrian crosswalk area RC2 as the detection area.

Figure 12:
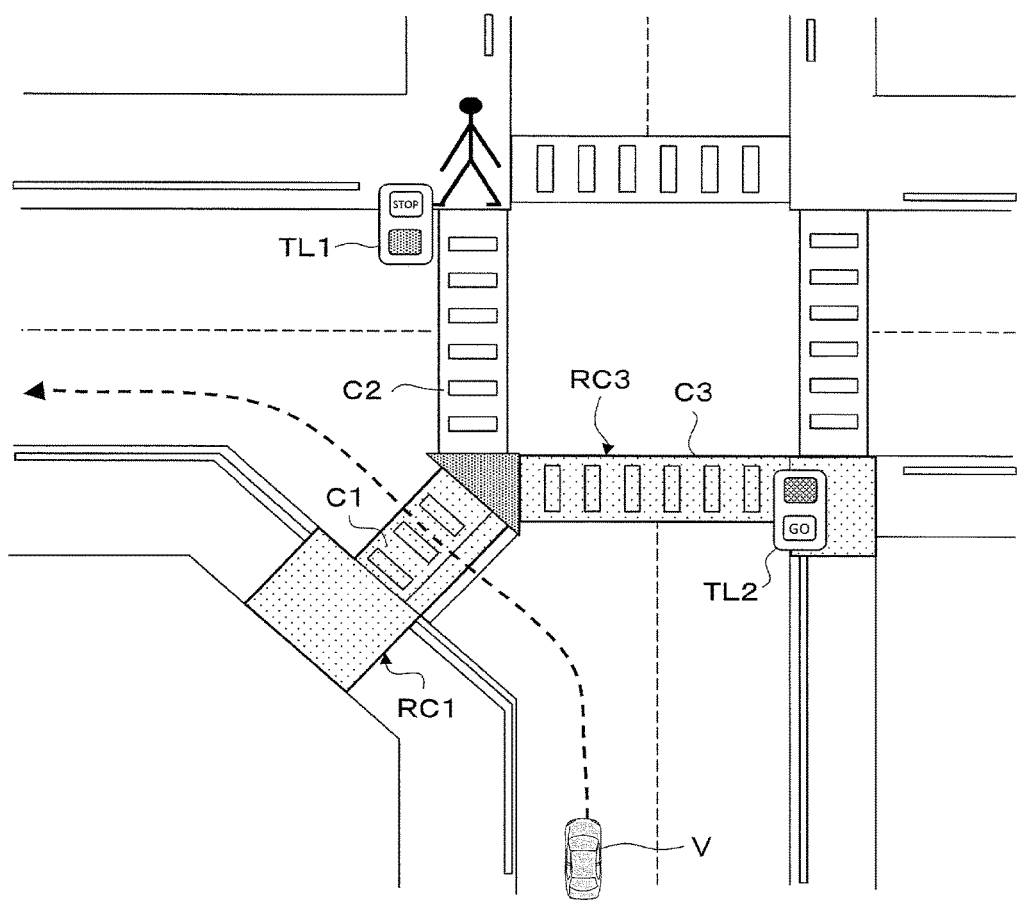
FIG. 12 is a diagram (part 2) illustrating an example of the detection area in the second embodiment of the present invention.

FIG. 12 is a diagram illustrating a different scene than the scene of FIG. 11 for describing an example of a method of setting the detection area in the second embodiment. In the example illustrated in FIG. 12, the traffic signal for pedestrians TL1 at the second pedestrian crosswalk C2 indicates a signal representing that a moving object cannot cross the second pedestrian crosswalk C2 while the traffic signal for pedestrians TL2 at the second pedestrian crosswalk C3 indicates a signal representing that a moving object can cross the second pedestrian crosswalk C3. In this case, the control device 160 uses the crossing possibility determination function to determine that crossing of the second pedestrian crosswalk C2 is not possible and crossing of the second pedestrian crosswalk C3 is possible. Accordingly, the control device 160 uses the detection area setting function to determine whether or not a part of the first pedestrian crosswalk area RC1 of the first pedestrian crosswalk C1 and a part of the second pedestrian crosswalk area RC3 of the second pedestrian crosswalk C3 overlap each other. In the example illustrated in FIG. 12, a part of the first pedestrian crosswalk area RC1 and a part of the second pedestrian crosswalk area RC3 overlap each other. The control device 160 therefore uses the detection area setting function to set the first pedestrian crosswalk area RC1 and the second pedestrian crosswalk area RC3 as the detection area.

Figure 13:
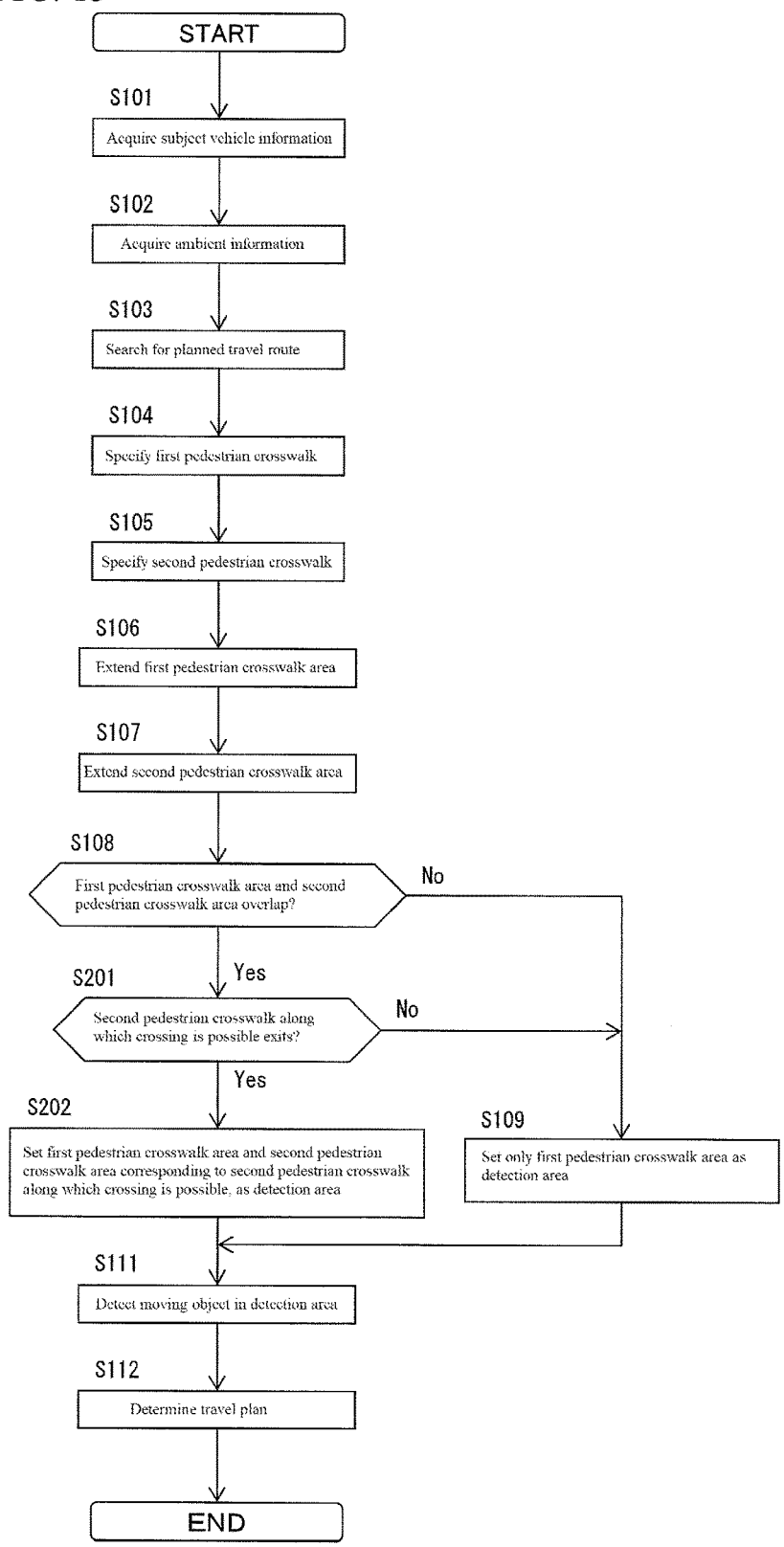
FIG. 13 is a flowchart illustrating an example of the travel control process according to the second embodiment of the present invention.

With reference to FIG. 13, the travel control process according to the second embodiment will then be described. The processes of steps S101 to S108, S111, and S112 are performed in the same manner as in the first embodiment and the description will be omitted. In step S108, when a determination is made that a part of the first pedestrian crosswalk area and a part of the second pedestrian crosswalk area overlap each other, the routine proceeds to step S201. For example, in the examples illustrated in FIG. 11 and FIG. 12, a part of the first pedestrian crosswalk area RC1 and a part of the second pedestrian crosswalk area RC2 overlap each other and a part of the first pedestrian crosswalk area RC1 and a part of the second pedestrian crosswalk area RC3 overlap each other, so the routine proceeds to step S201.

In step S201, the crossing possibility determination function serves to determine whether or not there is a second pedestrian crosswalk which a moving object can cross. For example, the control device 160 can use the crossing possibility determination function to determine the signal indication of the traffic signal for pedestrians at the second pedestrian crosswalk from the image captured by a camera thereby to determine whether or not there is a second pedestrian crosswalk which a moving object can cross. When there is a second pedestrian crosswalk which a moving object can cross, the routine proceeds to step S202, while when there is not a second pedestrian crosswalk which a moving object can cross, the routine proceeds to step S109.

In step S202, the detection area setting function serves to set the detection area. In the second embodiment, the control device 160 uses the detection area setting function to set the first pedestrian crosswalk area and the second pedestrian crosswalk area corresponding to the second pedestrian crosswalk which a moving object can cross, as the detection area. Through this operation, in the example illustrated in FIG. 11, the first pedestrian crosswalk area RC1 and the second pedestrian crosswalk area RC2 of the second pedestrian crosswalk C2 are set as the detection area. On the other hand, in the example illustrated in FIG. 12, the first pedestrian crosswalk area RC1 and the second pedestrian crosswalk area RC3 of the second pedestrian crosswalk C3 are set as the detection area.

As described above, in the second embodiment, a determination is made whether there is a second pedestrian crosswalk along which crossing is possible, on the basis of any of the signal indication of a traffic signal for pedestrians at the second pedestrian crosswalk, presence or absence of an obstacle on the second pedestrian crosswalk, and presence or absence of another vehicle expected to pass through the second pedestrian crosswalk. Then, when there is a second pedestrian crosswalk along which crossing is possible, an area including the second pedestrian crosswalk area corresponding to the second pedestrian crosswalk along which crossing is possible is set as the detection area. In other words, when a moving object cannot cross the second pedestrian crosswalk, the second pedestrian crosswalk area corresponding to the second pedestrian crosswalk is not set as the detection area. Through this operation, an additional effect can be obtained in the second embodiment in addition to the effects of the first embodiment. That is, a moving object can be detected only in the second pedestrian crosswalk along which the moving object crosses, among the second pedestrian crosswalks. As a result, a moving object that may come close to the subject vehicle when the subject vehicle reaches the first pedestrian crosswalk can be detected with a higher degree of accuracy.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the above-described embodiments, a configuration is exemplified in which the first pedestrian crosswalk area corresponding to the first pedestrian crosswalk and the second pedestrian crosswalk area corresponding to the second pedestrian crosswalk are extended, but the present invention is not limited to this configuration and another configuration can also be employed in which, for example, either the first pedestrian crosswalk area or the second pedestrian crosswalk area is extended. In the latter configuration, the first pedestrian crosswalk area or the second pedestrian crosswalk area may be more extended as compared with the above-described embodiments so that the second pedestrian crosswalk area corresponding to the second pedestrian crosswalk close to the first pedestrian crosswalk can be appropriately set as the detection area.

In the above-described embodiments, a configuration is exemplified in which the first pedestrian crosswalk area and the second pedestrian crosswalk area are extended to the positions of respective stop lines located before the first pedestrian crosswalk and the second pedestrian crosswalk, but the present invention is not limited to this configuration and another configuration can also be employed in which, for example, the first pedestrian crosswalk area and the second pedestrian crosswalk area are extended in accordance with the distance from the subject vehicle V1 to the first pedestrian crosswalk. Specifically in the latter configuration, when the distance from the subject vehicle to the first pedestrian crosswalk is a predetermined value or more, the first pedestrian crosswalk area and the second pedestrian crosswalk area may be more extended in the width direction of the pedestrian crosswalk as compared with when the distance from the subject vehicle to the first pedestrian crosswalk is less than the predetermined value. As the distance from the subject vehicle to the first pedestrian crosswalk increases, the accuracy with which the ambient detection sensor 110 detects a moving object on the first pedestrian crosswalk deteriorates; therefore, the first pedestrian crosswalk area and the second pedestrian crosswalk area may be more extended in the width direction of the first pedestrian crosswalk thereby to allow for appropriate detection of a moving object on the first pedestrian crosswalk.

In the above-described embodiments, a configuration is exemplified in which a pedestrian crosswalk in the length direction of the first pedestrian crosswalk is specified as the second pedestrian crosswalk from among pedestrian crosswalks close to the first pedestrian crosswalk, but the present invention is not limited to this configuration and another configuration can also be employed in which, for example, the traffic line of a moving object crossing the first pedestrian crosswalk (the traffic line refers to a line representing the direction/frequency when a person or an object moves) is estimated on the basis of road configurations (sidewalks, roadside strips, pedestrian crosswalks, and median strips) close to the first pedestrian crosswalk, and a pedestrian crosswalk to which the distance from the first pedestrian crosswalk is a predetermined distance or less along the estimated traffic line of the moving object is estimated as the second pedestrian crosswalk. In another configuration, a pedestrian crosswalk to which the distance from the first pedestrian crosswalk is a predetermined distance or less regardless of the direction may be specified as the second pedestrian crosswalk.

In the above-described embodiments, a configuration is exemplified in which the moving distance for a moving object to move until the subject vehicle reaches the first pedestrian crosswalk is calculated by acquiring the moving speed of the moving object which is preliminarily stored in the ROM of the control device 160, but the present invention is not limited to this configuration and another configuration can also be employed in which an actual moving speed of the moving object is calculated by repeatedly detecting the moving object and the moving distance for the moving object to move until the subject vehicle reaches the first pedestrian crosswalk is calculated on the basis of the calculated actual moving speed of the moving object.

In the above-described embodiments, a configuration is exemplified in which the travel control apparatus 100 includes the database 140, but the travel control apparatus 100 can also be configured to receive the map information from a server provided outside the vehicle. The present invention is not limited to the form in which the travel control apparatus 100 is equipped in a vehicle. In the travel control apparatus 100, for example, the control device 160 or the control device 160 and database 140 may be provided outside the vehicle, and the travel control of the vehicle may be performed by remote control.

In the above-described embodiments, a configuration is exemplified in which the first pedestrian crosswalk area or the second pedestrian crosswalk area is extended into a sidewalk, but the present invention is not limited to this configuration and another configuration can also be employed in which, for example, when a roadside strip adjacent to the first pedestrian crosswalk or second pedestrian crosswalk exists, the first pedestrian crosswalk area or the second pedestrian crosswalk area is extended into the roadside strip. In the latter configuration, with consideration for guardrails installed at the roadside strip, a portion of the first pedestrian crosswalk area or second pedestrian crosswalk area in the roadside strip is extended in the width direction of the first pedestrian crosswalk.

In the above-described embodiments, the ambient detection sensor 110 corresponds to the detector of the present invention and the control device 160 corresponds to the controller of the present invention.

DESCRIPTION OF REFERENCE NUMERALS

100 Travel control apparatus
  110 Ambient detection sensor
  120 Vehicle speed sensor
  130 Subject vehicle position detection device
  140 Database
  150 Drive control device
  160 Control device

The invention claimed is:

1. A travel control method for a vehicle performed by a controller including a processor, wherein the controller is configured to:
specify a pedestrian crosswalk through which a subject vehicle is expected to pass as a first pedestrian crosswalk;
specify another pedestrian crosswalk located within a predetermined distance from the first pedestrian crosswalk as a second pedestrian crosswalk;
perform an extension process of extending an area of at least one of the first pedestrian crosswalk and the second pedestrian crosswalk;
determine whether or not at least a part of the area of the first pedestrian crosswalk subjected to the extension process and at least a part of the area of the second pedestrian crosswalk subjected to the extension process overlap each other;
when a determination is made that at least a part of the area of the first pedestrian crosswalk subjected to the extension process and at least a part of the area of the second pedestrian crosswalk subjected to the extension process overlap each other, set an area including the first pedestrian crosswalk and the second pedestrian crosswalk as a detection area of a detector detecting an object around the subject vehicle;
detect a moving object in the detection area using the detector; and
control travel of the subject vehicle on a basis of a detection result of the detector.

2. The travel control method for a vehicle according to claim 1, wherein the controller is further configured to:
determine whether or not the moving object can cross the second pedestrian crosswalk; and
when a determination is made that the moving object cannot cross the second pedestrian crosswalk, exclude the area of the second pedestrian crosswalk from the detection area.

3. The travel control method for a vehicle according to claim 2, wherein the controller is further configured to:
determine whether or not the moving object can cross the second pedestrian crosswalk on a basis of at least one of a signal indication of a traffic signal for pedestrians at the second pedestrian crosswalk, presence or absence of an obstacle on the second pedestrian crosswalk, and presence or absence of another vehicle expected to pass through the second pedestrian crosswalk.

4. The travel control method for a vehicle according to claim 3, wherein the controller is further configured to:
estimate the signal indication of the traffic signal for pedestrians at the second pedestrian crosswalk from a signal indication of a traffic signal for vehicles located before the second pedestrian crosswalk on a basis of a correspondence relationship between the signal indication of the traffic signal for pedestrians at the second pedestrian crosswalk and the signal indication of the traffic signal for vehicles located before the second pedestrian crosswalk.

5. The travel control method for a vehicle according to claim 1, wherein when a median strip exists between the first pedestrian crosswalk and the second pedestrian crosswalk, the area of at least one of the first pedestrian crosswalk and the second pedestrian crosswalk is extended into the median strip.

6. The travel control method for a vehicle according to claim 1, wherein the controller is further configured to:
extend the area of at least one of the first pedestrian crosswalk and the second pedestrian crosswalk to a position of a stop line.

7. The travel control method for a vehicle according to claim 1, wherein the controller is further configured to:
extend the area of at least one of the first pedestrian crosswalk and the second pedestrian crosswalk into a sidewalk close to the at least one of the first pedestrian crosswalk and the second pedestrian crosswalk.

8. The travel control method for a vehicle according to claim 7, wherein when a guardrail is installed at the sidewalk, a portion extended into the sidewalk is further extended in a width direction of the first pedestrian crosswalk to an end part position of the guardrail on the first pedestrian crosswalk side, wherein the portion extended into the sidewalk is included in the area of at least one of the first pedestrian crosswalk and the second pedestrian crosswalk.

9. The travel control method for a vehicle according to claim 7, wherein the controller is further configured to:
calculate a moving distance in which the moving object moves until the subject vehicle reaches the first pedestrian crosswalk, on a basis of a moving speed of the moving object; and
further extend a portion extended into the sidewalk in a width direction of the first pedestrian crosswalk in accordance with the moving distance, the portion extended into the sidewalk being included in the area of at least one of the first pedestrian crosswalk and the second pedestrian crosswalk.

10. The travel control method for a vehicle according to claim 1, wherein when a distance from the subject vehicle to the first pedestrian crosswalk is a predetermined distance or more, the area of at least one of the first pedestrian crosswalk and the second pedestrian crosswalk is more extended in a width direction of the first pedestrian crosswalk as compared with when the distance from the subject vehicle to the first pedestrian crosswalk is less than the predetermined distance.

11. The travel control method for a vehicle according to claim 1, wherein when a determination is made that at least a part of the area of the first pedestrian crosswalk and at least a part of the area of the second pedestrian crosswalk do not overlap each other, only an area including the first pedestrian crosswalk is set as the detection area.

12. A travel control apparatus for a vehicle, comprising:
a detector configured to detect an object around a subject vehicle; and
a controller including a processor configured to control travel of the subject vehicle on a basis of a detection result of the detector, the controller being further configured to:
specify a pedestrian crosswalk through which the subject vehicle is expected to pass as a first pedestrian crosswalk;
specify another pedestrian crosswalk located within a predetermined distance from the first pedestrian crosswalk as a second pedestrian crosswalk;
perform an extension process of extending an area of at least one of the first pedestrian crosswalk and the second pedestrian crosswalk;
determine whether or not at least a part of the area of the first pedestrian crosswalk subjected to the extension process and at least a part of the area of the second pedestrian crosswalk subjected to the extension process overlap each other;
when a determination is made that at least a part of the area of the first pedestrian crosswalk and at least a part of the area of the second pedestrian crosswalk overlap each other, set an area including the first pedestrian crosswalk and the second pedestrian crosswalk as a detection area of the detector; and
detect a moving object in the detection area.

* * * * *